US012216421B2

(12) United States Patent
Oonishi et al.

(10) Patent No.: US 12,216,421 B2
(45) Date of Patent: Feb. 4, 2025

(54) IMAGE FORMING APPARATUS

(71) Applicant: KONICA MINOLTA, INC., Tokyo (JP)

(72) Inventors: Taizou Oonishi, Hachioji (JP); Yu Harashima, Hino (JP); Masashi Saito, Hachioji (JP); Kazunori Nishinoue, Kunitachi (JP); Tsutomu Sakamaki, Yokohama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/376,577

(22) Filed: Oct. 4, 2023

(65) Prior Publication Data

US 2024/0160133 A1 May 16, 2024

(30) Foreign Application Priority Data

Nov. 11, 2022 (JP) ................................ 2022-181063

(51) Int. Cl.
*G03G 15/20* (2006.01)

(52) U.S. Cl.
CPC ....... *G03G 15/205* (2013.01); *G03G 15/2032* (2013.01); *G03G 2215/00455* (2013.01)

(58) Field of Classification Search
CPC ........... G03G 15/2032; G03G 15/2035; G03G 15/205; G03G 15/206; G03G 15/2064; G03G 15/6517; G03G 2215/00455
See application file for complete search history.

(56) References Cited

U.S. PATENT DOCUMENTS

| | | | | |
|---|---|---|---|---|
| 4,969,016 | A * | 11/1990 | Kudoh | G03G 15/6517 83/342 |
| 9,869,958 | B2 | 1/2018 | Tanigami et al. | |
| 2007/0223953 | A1* | 9/2007 | Kagawa | G03G 15/2039 399/70 |
| 2008/0279582 | A1* | 11/2008 | Jao | G03G 15/2025 399/109 |
| 2008/0280035 | A1* | 11/2008 | Jao | G03G 15/2025 427/140 |
| 2009/0092422 | A1* | 4/2009 | Kagawa | G03G 15/2057 399/328 |
| 2010/0126021 | A1* | 5/2010 | Hurst | G03G 15/206 29/895.1 |

(Continued)

FOREIGN PATENT DOCUMENTS

JP 2015-055859 A 3/2015

*Primary Examiner* — Carla J Therrien
(74) *Attorney, Agent, or Firm* — Squire Patton Boggs (US) LLP

(57) ABSTRACT

An image forming apparatus including: an image former that forms an image on a recording material; includes a fixer that has a first fixing member having an elastic layer, a second fixing member that forms a fixing nip with the first fixing member, and an external heater that heats the first fixing member from outside, and fixes the image on the recording material by heating and pressing the conveyed recording material at the fixing nip; and a hardware processor that executes a thermal expansion mode, in which in the thermal expansion mode, the hardware processor causes the external heater to heat the first fixing member to a temperature higher than a temperature during normal printing.

13 Claims, 10 Drawing Sheets

(56) References Cited

U.S. PATENT DOCUMENTS

| | | | | |
|---|---|---|---|---|
| 2010/0148386 | A1* | 6/2010 | Hurst | G03G 21/1685<br>264/36.12 |
| 2010/0151068 | A1* | 6/2010 | Hurst | G03G 21/1685<br>425/150 |
| 2011/0091226 | A1* | 4/2011 | Ishigaya | G03G 21/02<br>399/33 |
| 2017/0023891 | A1* | 1/2017 | Otsuka | G03G 15/205 |
| 2017/0123355 | A1* | 5/2017 | Yamano | G03G 15/2053 |
| 2018/0209904 | A1* | 7/2018 | Itoh | G01N 21/57 |

* cited by examiner

IMAGE FORMING APPARATUS

CROSS-REFERENCE TO RELATED APPLICATION

The entire disclosure of Japanese patent application No. 2022-181063, filed on Nov. 11, 2022, is incorporated herein by reference in its entirety.

BACKGROUND

1. Technological Field

The present invention relates to an image forming apparatus.

2. Description of the Related Art

An electrophotographic image forming apparatus forms an image on a sheet by forming a toner image on the sheet and fixing the toner image on the sheet by a fixing device. The fixing device forms a fixing nip by pressing fixing members such as two rollers against each other to bring the fixing members into contact with each other, for example. Next, a fixing process of fixing the toner image on the sheet is performed by passing the sheet through this fixing nip and performing a heating and pressurizing process on the sheet (for example, Japanese Unexamined Patent Application Publication No. 2015-55859).

In a case where a sheet having an irregular portion is conveyed through the fixing nip, a crease (partial deformation) may occur on a surface of a fixing member, and the crease on the surface of the fixing member causes an image defect due to non-uniformity of a fixing property. An example of the sheet having the irregular portion is a creased or folded sheet. Further, in the case of using a continuous sheet as in Japanese Unexamined Patent Application Publication No. 2015-55859, for example, a joint is formed in a case where sheets temporarily cut for handling a sheet jam are connected again. In this joint, a tape used for adhesion or overlapping of the preceding and succeeding sheets causes an irregular portion (uneven portion).

SUMMARY

However, the image forming apparatus described in Japanese Unexamined Patent Publication No. 2015-55859 does not solve the problem of a crease on the fixing member, and Japanese Unexamined Patent Application Publication No. 2015-55859 does not disclose how to eliminate the crease that have occurred.

The present invention has been made in view of the above circumstances, and an object of the present invention is to provide an image forming apparatus capable of suppressing an image defect by eliminating a crease occurring in a fixing member.

To achieve at least one of the abovementioned objects, according to an aspect of the present invention, a device reflecting one aspect of the present inventions comprises the followings.

(1) An image forming apparatus including: an image former that forms an image on a recording material; includes a fixer that has a first fixing member having an elastic layer, a second fixing member that forms a fixing nip with the first fixing member, and an external heater that heats the first fixing member from outside, and fixes the image on the recording material by heating and pressing the conveyed recording material at the fixing nip; and a hardware processor that executes a thermal expansion mode, in which in the thermal expansion mode, the hardware processor causes the external heater to heat the first fixing member to a temperature higher than a temperature during normal printing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
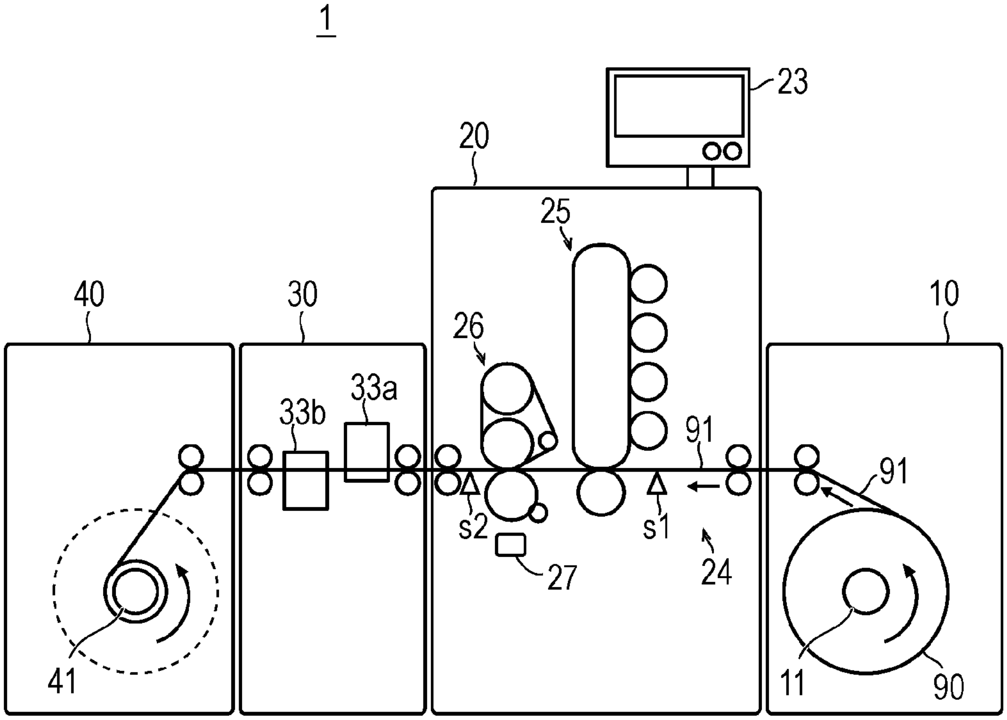
FIG. 1 is a diagram illustrating a schematic configuration of an image forming apparatus according to an embodiment.

Embodiments of the present invention will be described hereinafter with reference to the attached drawings. However, the scope of the present invention is not limited to the disclosed embodiments. In the description of the drawings, the same components are denoted by the same reference signs, and redundant description thereof will be omitted. In addition, dimensional ratios in the drawings are exaggerated for convenience of description and may be different from actual ratios. In addition, although an example in which a continuous sheet is used as a recording material is described in the present embodiment, the recording material is not limited thereto, and examples of the recording material include a cut sheet (paper sheet). Furthermore, as the continuous sheet, a long label sheet may be used in which a label coated with an adhesive is stuck to a long release sheet.

Figure 2:
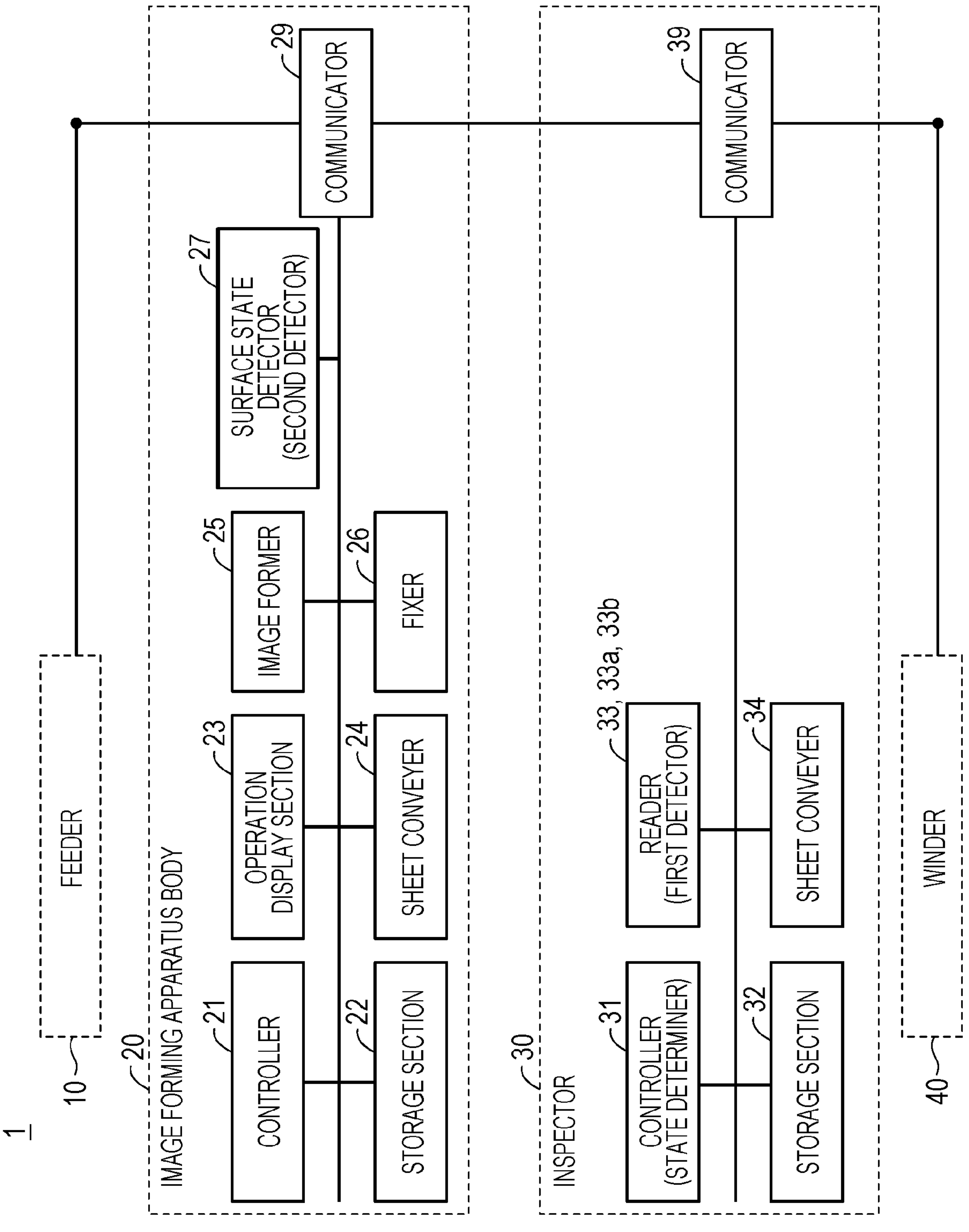
FIG. 2 is a block diagram illustrating the image forming apparatus.

FIG. 1 is a diagram illustrating a schematic configuration of an image forming apparatus 1 according to the present embodiment. FIG. 2 is a block diagram illustrating a hardware configuration of the image forming apparatus 1. As illustrated in FIG. 1, the image forming apparatus 1 includes a feeder 10, an image forming apparatus main body 20, an inspector 30, and a winder 40 that are mechanically and electrically connected to each other.

(Feeder 10 and Winder 40) The feeder 10 includes a folder 11 to which an original roll 90 of a continuous sheet 91 (also referred to as a roll sheet) is detachably attached. The winder 40 includes a folder 41 for winding the continuous sheet 91 fed from the original roll 90. In addition, each of the feeder 10 and the winder 40 includes a controller, a storage section, a sheet conveyer, and a communicator (some configurations are not illustrated). These components have the same functions as those of components having corresponding names in the image forming apparatus main body 20, which will be described later. The feeder 10 feeds the continuous sheet 91 of the original roll 90 attached to the folder 11 to the downstream side of a conveyance path. The image forming apparatus main body 20 forms an image on the fed continuous sheet 91. The continuous sheet 91 on which the image is formed by the image forming apparatus main body 20 is conveyed to the winder 40 via the inspector 30 on the downstream side, and is wound around and held on the folder 41. The feeder 10 and the winder 40 cooperate to adjust roll sheet tension according to the thickness and type of the continuous sheet 91. For example, in a case where the continuous sheet 91 is a thin sheet, the roll sheet tension is set lower than that of a plain sheet or a thick sheet.

(Image Forming Apparatus Main Body 20)

As illustrated in FIGS. 1 and 2, the image forming apparatus main body 20 includes a controller 21, a storage section 22, an operation display section 23, a sheet conveyer 24, an image former 25, a fixer 26, a surface state detector 27, and a communicator 29, which are connected to each other via a signal line.

(Controller 21)

The controller 21 is a CPU and performs control of each of the components of the apparatus and various types of arithmetic processing according to a program.

(Storage Section 22)

The storage section 22 includes a ROM that stores various programs and various data in advance, a RAM that serves as a work area and temporarily stores programs and data, a hard disk that stores various programs and various data, and the like.

(Operation Display Section 23)

The operation display section 23 includes a touch panel, a numeric keypad, a start button, a stop button, and the like, and is used for displaying various types of information such as a warning display, and for inputting various types of settings and instructions. In addition, a user can instruct to execute the thermal expansion mode from an external PC via the operation display section 23 or the communicator 29. In this case, the operation display section 23 or the communicator 29 functions as a receiver that receives the instruction to execute the thermal expansion mode.

The thermal expansion mode can be executed not only during a non-printing period but also during printing. In the thermal expansion mode, a fixing member (first fixing member) having an elastic layer is heated to a temperature higher than that during (normal) printing, so that the fixing member is brought into a state in which thermal expansion progresses more than that during normal printing. Thus, the fixing member is refreshed, and a crease that occurred on a surface of the fixing member is eliminated. Examples of the "crease" described herein include partial deformation of the fixing member. The same applies hereinafter. The crease is also hereinafter referred to as a "fixing member crease". Details of this thermal expansion mode will be described later.

(Sheet Conveyer 24)

The sheet conveyer 24 includes a conveyance path for which a plurality of conveyance rollers are disposed, and conveys the continuous sheet 91 at a predetermined sheet conveyance speed in cooperation with the sheet conveyers of the feeder 10 and the winder 40. A plurality of sensors that detect the state of the sheet are disposed above the conveyance path. FIG. 1 illustrates two sensors s1 and s2 as representatives. Each of the sensors (sensors s1, s2, and the like) detects whether or not a sheet (cut sheet) is present, and the position of the sheet. Based on detection signals of the sensors, the controller 21 detects a conveyance failure such as a jam relating to a sheet including a cut sheet and the continuous sheet 91.

(Image Former 25)

The image former 25 forms an image by, for example, an electrophotographic method, and includes writers, developers, and primary transfer sections corresponding to basic colors (yellow, magenta, cyan, and black), an intermediate transfer belt, a secondary transfer section, and the like. Toner images formed by the developers for the respective colors are transferred onto the intermediate transfer belt (primary transfer) and are successively superposed so as to form a full-color toner image. The full-color toner image (before fixing) is transferred onto the continuous sheet 91 by the secondary transfer section. Although the intermediate transfer belt type image former is described as an example in the present embodiment, a direct transfer type image former that directly transfers an image from a photoconductor drum to a sheet without including an intermediate transfer belt may be used.

(Fixer 26)

Figure 3:
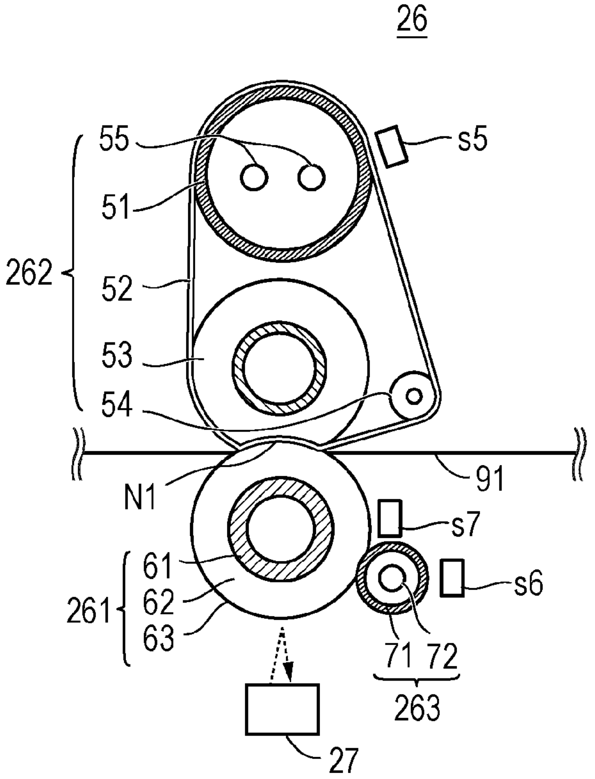
FIG. 3 is a schematic diagram illustrating a configuration of a fixer.

FIG. 3 is a schematic diagram illustrating a configuration of the fixer 26.

The fixer 26 fixes the toner image formed on a surface of the continuous sheet 91 by heating, pressurizing, and fixing the toner image on the continuous sheet 91 at the fixing nip N1. As illustrated in FIG. 3, the fixer 26 includes a pressurizer 261, a heater 262, an external heater 263, temperature sensors s5, s6, and s7, and a driving section (not illustrated). The temperature sensors s5, s6, and s7 detect surface temperatures of the heater 262, the external heater 263, and the pressurizer 261, respectively. Each of the temperature sensors S5, S6, and S7 may be arranged at a plurality of positions in an axial direction (width direction). The pressurizer 261 and the heater 262 are pressed against each other at a predetermined pressure so as to be brought into contact with each other, thereby forming the fixing nip N1. The driving section includes a motor as a driving source and a gear mechanism that transmits a driving force of the motor, and rotationally drives at least one of the heater 262 and the pressurizer 261. For example, the driving section drives the heater 262 and the pressurizer 261 by two motors. In the example illustrated in FIG. 3, the pressurizer 261 on the lower side functions as a first fixing member having an elastic layer as described below. Furthermore, the heater 262

(in particular, an upper pressure roller 53 and a fixing belt 52 described below) on the upper side functions as a second fixing member.

(Heater 262)

The heater 262 includes a heating roller 51, the fixing belt 52, the upper pressure roller 53, an auxiliary roller 54, and heaters 55.

The heating roller 51 is a cylindrical metal roller, and the plurality of heaters 55 serving as heating sources such as halogen lamps are disposed inside the heating roller 51. The plurality of heaters 55 have different heat distributions (light distributions) in the axial direction. The heating roller 51 heated by the internal heaters 55 heats the fixing belt 52. The heated fixing belt 52 passes through the fixing nip N1 together with the sheet conveyed to the fixer 26, thereby heating the sheet (continuous sheet 91). The temperature sensor s5 is disposed facing the fixing belt 52 and is not in contact with the fixing belt 52. The temperature sensor s5 detects a temperature of a surface of the fixing belt 52 heated by the heaters 55. In the fixer 26, supply of power to the heaters 55, that is, a rate of turning on of the heaters 55, is controlled by the controller 21 such that the temperature detected by the temperature sensor s5 becomes a predetermined control temperature (fixing temperature). The control temperature is set to a range of 160° C. to 200° C. in a standard state (during image formation) (the control temperature can be set to a temperature not in the range depending on the basis weight and thickness of the sheet).

The endless fixing belt 52 is stretched by the heating roller 51, the upper pressure roller 53, and the auxiliary roller 54. The fixing belt 52 has, for example, a size corresponding to an inside diameter of 168 mm. The fixing belt 52 is formed of, for example, an elastic layer and a PFA layer (hereinafter, also referred to as a PFA tube layer) on the elastic layer. For example, the base material of the elastic layer is an endless base formed of conductive polyimide (PI) and having a thickness of 70 μm, and the elastic layer is formed of the endless base and heat-resistant silicon rubber provided on an outer peripheral surface of the endless base and has a thickness in a range of 100 μm to 400 μm. The PFA layer as the upper layer on the elastic layer is a layer having a thickness in the range of 10 μm to 40 μm formed by being coated with a PFA (perfluoroalkoxy) tube which is a heat-resistant resin.

The upper pressure roller 53 has, for example, an outer diameter of 90 mm. The upper pressure roller 53 includes, for example, a cylindrical core made of metal such as iron, and an elastic layer made of silicon rubber, which is heat-resistant solid rubber, and having a thickness of 20 mm, on an outer peripheral surface of the core.

The auxiliary roller 54 is formed of metal having a small diameter or of this metal covered with heat-resistant rubber. Furthermore, the auxiliary roller 54 functions as a tension roller, a predetermined pressure toward the outside is applied to the auxiliary roller 54, and the auxiliary roller 54 is movable within a predetermined movable range. The auxiliary roller 54 may be omitted.

(Pressurizer 261)

The pressurizer 261 is also referred to as a lower pressure roller or a lower roller. The pressurizer 261 functioning as the first fixing member has, for example, an outer diameter of 80 mm. The pressurizer 261 includes, for example, a cylindrical core 61 made of metal such as iron, an elastic layer 62 disposed on an outer peripheral surface of the core 61, having a thickness of several millimeters (for example, a thickness of 6 mm), and made of silicon rubber that is heat-resistant solid rubber, and a PFA layer 63 disposed on the elastic layer 62, having a thickness of 30 μm, and formed by being covered with a PFA tube.

(External Heater 263)

The external heater 263 includes a cylindrical metal roller 71 and a heater 72, such as a halogen lamp, disposed inside the metal roller 71 as a heat source. The external heater 263 is a rotating body, is pressed against an outer peripheral surface of the pressurizer 261 at a predetermined pressure so as to be brought into contact with the outer peripheral surface of the pressurizer 261, and is driven to rotate according to the rotation of the pressurizer 261. The temperature sensor s6 is disposed facing the external heater 263, is not in contact with the external heater 263, and detects a temperature of a surface of the external heater 263 heated by the heater 72. The temperature sensor s7 is disposed facing the pressurizer 261, is not in contact with the pressurizer 261, and detects a temperature of the surface of the pressurizer 261. When the temperature sensor s7 detects a temperature exceeding an upper limit temperature T9, the controller 21 may stop the supply of power to the heater 72 regardless of the temperature detected by the temperature sensor s6. Alternatively, the heater 72 may include a plurality of heaters 72 having different heat distributions in the axial direction. For example, the heater 72 is constituted by two heaters 72 in which heat distributions are biased toward the front side and the rear side in the axial direction, and the controller 21 selects a heater 72 to be used according to a portion where a fixing member crease occurs. For example, in third and fourth modifications to be described later in which first and second detectors are used, the controller 21 can estimate a portion where a fixing member crease in the axial direction occurs.

In the fixer 26, the supply of power to the heater 72, that is, a rate of turning on of the heater 72, is controlled by the controller 21 such that the temperature detected by the sensor s6 is a control temperature T0 during normal printing (including a standby state for preheating, and the same applies hereinafter), and is a control temperature T1 (T0<T1) in the thermal expansion mode. The control temperatures T0 and T1 may be in a predetermined temperature range. Further, in the thermal expansion mode, by setting the control temperature T1 higher than the control temperature T0 during normal printing, the pressurizer 261 is heated to a temperature higher than that during normal printing. The elastic layer 62 or the PFA layer 63 of the pressurizer 261 (lower pressure roller) is refreshed to eliminate a fixing member crease by being brought into a state in which thermal expansion progresses more than that during normal printing. The control temperature T0 at the time of normal printing may be room temperature. In this case, the heater 72 is in an off state during normal printing. The control temperature T1 is preferably set to a temperature higher than an average temperature or a saturation temperature that the temperature of the surface of the pressurizer 261 reaches due to heat conduction (of heat caused by the heaters 55) from the fixing nip N1 during normal printing (continuous printing for a long time). For example, the control temperature T1 is set sufficiently higher than the average temperature of 90° C. to 100° C. that the temperature of the surface of the pressurizer 261 reaches. For example, by setting the control temperature T1 to 200° C., the temperature of the surface of the pressurizer 261 is controlled to a temperature of 140 to 160° C., which is higher than a normal temperature.

(Surface State Detector 27)

The surface state detector 27 functions as a second detector and detects a state of the surface of the pressurizer 261. For example, the surface state detector 27 includes a laser displacement meter, and measures the state of the surface of the pressurizer 261 with this laser displacement meter. When the surface state detector 27 detects an uneven or irregular portion of a predetermined level or more on the surface of the fixing member, the surface state detector 27 determines that a crease has occurred on the surface of the fixing member. For example, when an irregular or uneven portion of several to several tens of μm or more (for example, 15 μm or more) relative to the average position (height distance) of the surface is present on the surface of the fixing member, the surface state detector 27 determines that a crease has occurred on the surface of the fixing member. As another example, the surface state detector 27 may include a camera having a light source and an imaging element such as a CCD. In this case, the surface state detector 27 captures an image of the state of the surface of the pressurizer 261 and analyzes the captured image to detect that a crease has occurred on the surface of the pressurizer 261.

(Communicator 29)

The communicator 29 is an interface for communicating with other devices such as the feeder 10 and the winder 40. The communicator 29 is also an interface for network connection with an external device such as a PC.

(Inspector 30)

The inspector 30 includes a controller 31, a storage section 32, a reader 33, a sheet conveyer 34, and a communicator 39, which are connected to each other via a signal line. The controller 31, the storage section 32, the sheet conveyer 34, and the communicator 39 have the same functions as the components having the corresponding names, that is, have the same functions as the controller 21, the storage section 22, the sheet conveyer 24, and the communicator 29, respectively.

The inspector 30 functions as a first detector, or the controller 31 and the reader 33 of the inspector 30 function as the first detector. The first detector determines a sheet conveyance state and transmits a result of the determination to the controller 21. The controller 21 of the image forming apparatus main body 20 determines whether or not the execution of the thermal expansion mode is possible according to the result of the determination as described later.

The reader 33 is a so-called scanner and includes a first reader 33*a* disposed on the upper side of the conveyance path and a second reader 33*b* disposed on the lower side of the conveyance path. The first reader 33*a* disposed on the upper side reads an image on an image forming surface in a single-sided mode or reads an image on a back surface (second surface) in a double-sided mode. The reader 33*b* disposed on the lower side reads an image on the front surface (first surface) in the double-sided mode. In a case where a cut sheet is used as a sheet in the double-sided mode, an image is formed on a first surface of the sheet by the image former 25 and the fixer 26 of the image forming apparatus main body 20. Thereafter, an image is formed on a second surface of the sheet via a double-sided conveyance path (not illustrated). In this manner, image formation on both sides of the sheet is performed.

The first reader 33*a* (the same applies to the second reader 33*b*) generates a read image (also referred to as read image data) by reading an image on a sheet (such as the continuous sheet 91) on which an image has been formed by the image forming apparatus main body 20. The first reader 33*a* includes a sensor array, an optical system, and an LED light source. The sensor array is formed by arranging a plurality of optical elements such as CCDs in a line along the width direction (main scanning direction). The sensor array is a color line sensor capable of reading the entire width range of the continuous sheet 91 (or a cut sheet) in the width direction of the continuous sheet 91 (or the cut sheet). The optical system includes a plurality of mirrors and lenses. The LED light source irradiates the surface of the continuous sheet 91 passing through a reading position on a main conveyance path with light. An image of the reading position is guided by the optical system and is formed on the sensor array.

(State Determiner)

The controller 31 functions as a state determiner and determines an image state and/or a conveyance state. The controller 31 (state determiner) analyzes a read image obtained by reading the continuous sheet 91 by the reader 33 (mainly, the first reader 33*a*) and determines the image state. For example, the controller 31 compares the image density of the read image with a density (density at the normal time) assumed from an image signal of print source data in a certain region on the sheet, and determines an image defect or the normal state as the image state according to an insufficient density or an occurrence level of periodic unevenness of the density. The image defect to be determined includes periodic image unevenness corresponding to a rotation period of a fixing member caused by a crease that has occurred on the fixing member (particularly, the first fixing member) of the fixer 26, and an image defect caused by a crease of the sheet itself. Furthermore, as the conveyance state, the controller 31 detects edges in the width direction of the continuous sheet 91 from the read image and determines whether or not the conveyance is normally performed. In a case where a sheet crease has occurred near an edge of the sheet, it is possible to detect that the sheet crease has occurred by detecting the edge. The controller 31 of the inspector 30 transmits a result of detecting the image state on the continuous sheet 91 after the fixing based on the read image or a result of detecting the conveyance state of the continuous sheet 91 based on the read image to the controller 21 of the image forming apparatus main body 20. The controller 21 determines whether or not the execution of the thermal expansion mode is possible according to the result of the detection.

The inspector 30 may include any of a CCD camera, a density system, and a laser displacement meter together with or instead of the scanner described above, and may detect the image state of the sheet or the conveyance state of the sheet based on detection data of the scanner.

Thermal Expansion Mode in First Embodiment

Next, the thermal expansion mode executed in the image forming apparatus 1 according to the first embodiment will be described with reference to FIGS. 4A to 10.

Figure 4A:
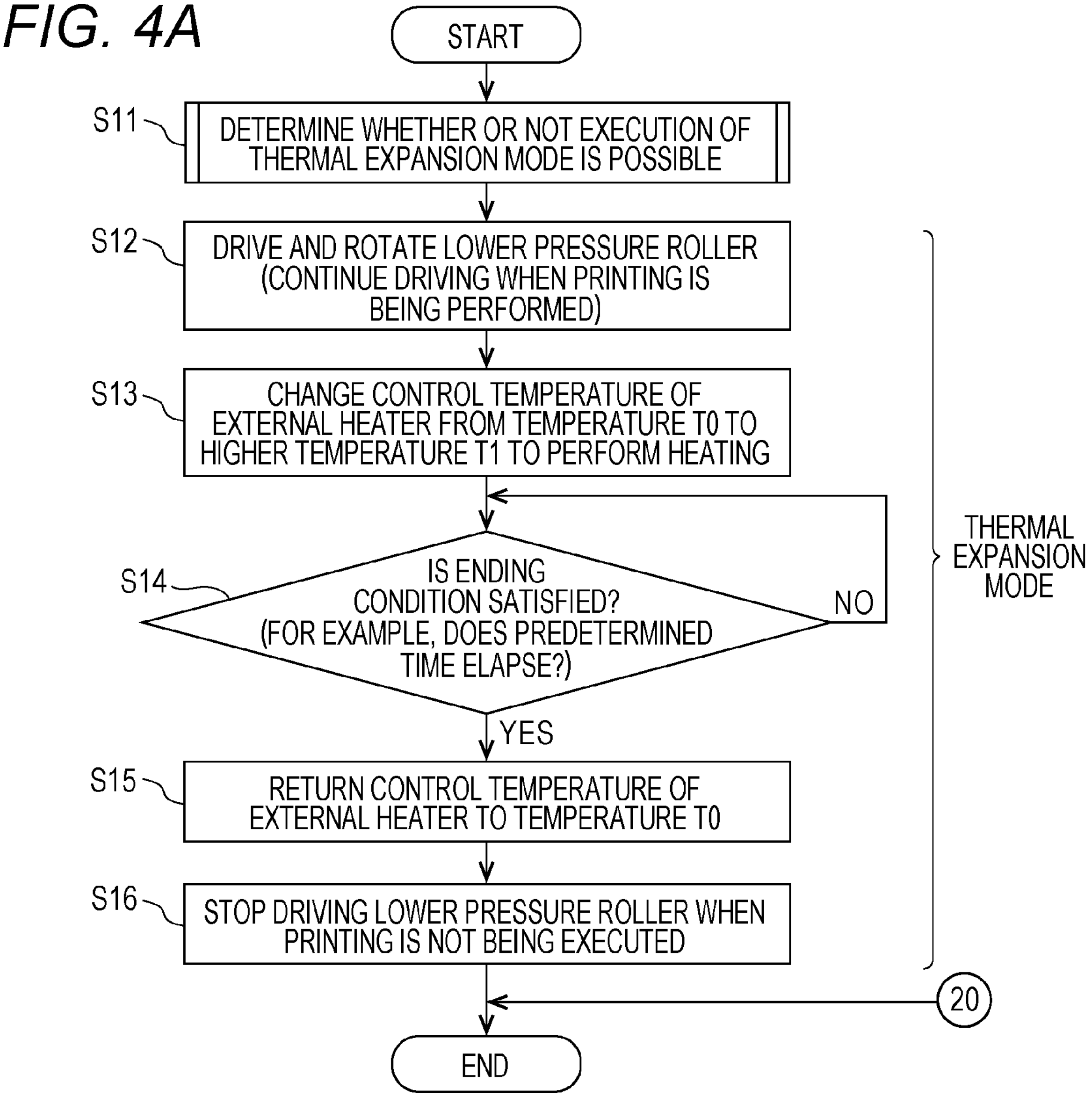
FIG. 4A is a flowchart illustrating a thermal expansion mode executed by an image forming apparatus according to a first embodiment.

A fixing member crease of the fixer 26 that is improved by the thermal expansion mode will be described. The pressurizer 261 (first fixing member) is covered with the PFA tube (PFA layer 63) as an uppermost layer (surface layer). When a sheet having an uneven portion, for example, a creased sheet or the continuous sheet 91 having a joint, is passed through the fixing nip N1, a crease occurs on the surface of the pressurizer 261 due to the uneven portion. That is, the crease occurs on the PFA layer 63. The thinner the PFA layer 63 is, the more likely this crease is to occur. In addition, the thicker the elastic layer 62 (silicon rubber layer) of the pressurizer 261 (first fixing member) is, the more likely this crease is to occur. Furthermore, as the temperature of the pressurizer 261 when the uneven portion passes through the fixing nip N1 is lower, the crease is more likely to occur (more likely to remain). Normally, during printing, the heater 262 is controlled to have a predetermined control temperature (fixing temperature) by heating by the heaters 55 in order to fix a toner image, but the pressurizer 261 is not actively heated. During printing, the pressurizer 261 is only warmed to some extent by heat conduction through the fixing nip N1. Therefore, the pressurizer 261 normally has a lower temperature than the heater 262. Due to such a configuration condition and such a temperature condition, a fixing member crease is more likely to occur in the pressurizer 261 (lower pressure roller) than in the fixing belt 52. In a case where a fixing member crease occurs, the fixing member crease does not immediately and easily return to an original state and tends to remain as a crease (recognized as a crease effect). The fixing member crease causes non-uniformity of a fixing property, resulting in an image defect. In the present embodiment, the image forming apparatus 1 executes the following thermal expansion mode for eliminating a fixing member crease in order to suppress the occurrence of an image defect due to a fixing member crease. FIG. 4A is a flowchart illustrating the thermal expansion mode.

(Step S11)

Figure 4B:
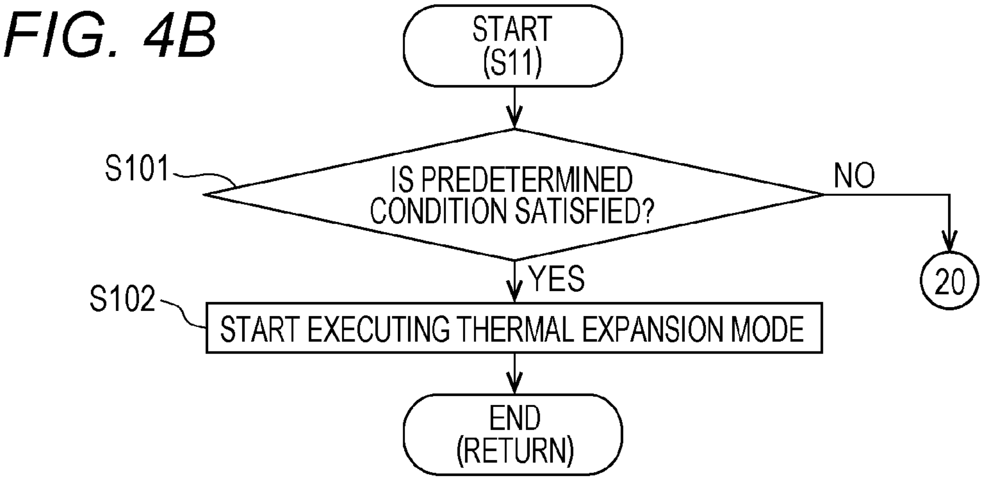
FIG. 4B is a subroutine flowchart illustrating processing in step S11 (determination as to whether execution is possible)

The controller 21 of the image forming apparatus main body 20 (image forming apparatus 1) determines whether or not the execution of the thermal expansion mode is possible. FIG. 4B is a subroutine flowchart illustrating the processing in step S11.

(Step S101)

In step S101, the controller 21 determines whether or not the image forming apparatus 1 satisfies a predetermined condition based on a condition stored in the storage section 22. For example, (1) a case where the image forming apparatus 1 is powered on. Further, (2) a case where a distance by which the fixer 26 is driven reaches a fixed distance, for example, a distance (also referred to as a nip travel distance) by which the sheet is conveyed reaches a determination threshold (for example, 100 m), or the number of printed sheets on cut sheets reaches a determination threshold (for example, 2000 sheets). Note that the determination thresholds (the conveyance distance and the number of printed sheets) relating to the distance by which the fixer 26 is driven may be changed by the user via the operation display section 23.

In a case where the controller 21 determines that the predetermined condition is satisfied (YES), the controller 21 advances a subroutine process illustrated in FIG. 4B to step S102. On the other hand, in a case where the predetermined condition is not satisfied (NO), the controller 21 ends the subroutine process illustrated in FIG. 4B and a main process illustrated in FIG. 4A (circled number 20).

(Step S102)

In response to satisfaction of a predetermined condition such as reception of an instruction from the user, the controller 21 ends the subroutine flowchart illustrated in FIG. 4B (return). Then, the controller 21 starts executing the thermal expansion mode in steps S12 to S16 of the main flowchart illustrated in FIG. 4A.

(Step S12)

When the fixer 26 including the pressurizer 261 (lower pressure roller) is not driven to rotate, the controller 21 starts driving the fixer 26. When the fixer 26 is in a driven state during the execution of printing or the like, the controller 21 continues to drive the fixer 26. In the first embodiment, the thermal expansion mode is executed both during the execution of printing and when printing is not being executed.

(Step S13)

The controller 21 changes the control temperature T0 of the external heater 263 to the control temperature T1 that is higher than the control temperature T0. The supply of power to the heater 72 is controlled so that the temperature reaches the control temperature T1.

(Step S14)

The controller 21 determines whether or not an ending condition is satisfied. For example, when an elapsed time from the start of the execution of the thermal expansion mode reaches a predetermined time (for example, one to several minutes), the controller 21 determines that the ending condition is satisfied. Note that the elapsed time may be determined as an elapsed time from when the temperature first becomes equal to the control temperature T1 after the start of the execution of the thermal expansion mode (or after the start of the supply of power to the heater 72). In a case where the end condition is not satisfied (NO), the thermal expansion mode is continued. On the other hand, in a case where the end condition is satisfied (YES), the controller 21 advances the process to step S15.

(Step S15)

Here, the control temperature T1 is returned to the low control temperature T0. Accordingly, the supply of power to the heater 72 is stopped.

(Step S16)

When the printing is not being executed, the driving of the fixer 26 including the pressurizer 261 (lower pressing roller) is stopped and the process is ended (END).

As described above, in the image forming apparatus according to the first embodiment, in the thermal expansion mode, the temperature of the first fixing member is set to a temperature higher than that during normal printing by the external heater. Thus, the thermal expansion of the first fixing member (in particular, the thermal expansion of the elastic layer) is made larger than that during printing, so that a fixing member crease that has occurred in the first fixing member can be eliminated and an image defect can be suppressed.

In particular, since the thermal expansion mode is performed by heating by the external heater 263 in the first embodiment, it is possible to execute the thermal expansion mode even during printing. Therefore, the productivity does not decrease even when the thermal expansion mode is executed. In particular, in a case where the continuous sheet is used, the thermal expansion mode can be executed without removing the continuous sheet from the fixer 26, and therefore the workability does not decrease. In particular, in the present embodiment, the first fixing member (pressurizer 261) which is heated and thermally expanded by the external heater 263 is a lower pressing roller disposed on the back surface side opposite to the surface of the recording material on which the toner image to be fixed is formed. Therefore, even when the temperature is raised during normal printing, there is almost no effect on the image (image after fixing) or the conveyance property. Further, in the first embodiment, since the image forming apparatus 1 makes the determination based on whether or not the image forming apparatus 1 satisfies the predetermined condition (FIG. 4B), the present invention can be implemented without providing a special input device or detector.

FIRST TO FIFTH MODIFICATIONS

In the first embodiment illustrated in FIGS. 4A and 4B, the image forming apparatus 1 determines whether or not the operation state of the image forming apparatus 1 satisfies the predetermined condition, thereby determining whether or not the execution of the thermal expansion mode is possible. However, the present invention is not limited thereto, and in the image forming apparatus 1, whether or not the execution of the thermal expansion mode is possible may be determined by methods described in the following modifications.

First Modification (Printing Conditions)

Figure 5:
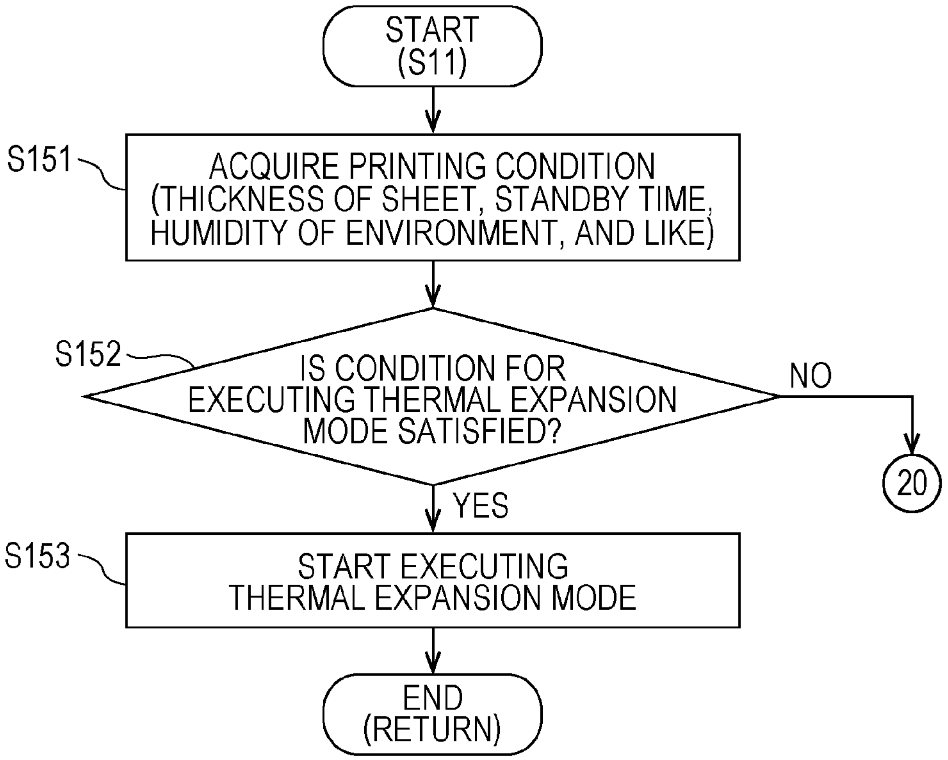
FIG. 5 is a subroutine flowchart illustrating processing in step S11 in a first modification.

FIG. 5 is a subroutine flowchart illustrating processing in step S11 in a first modification. A subroutine process according to the first modification is performed from the start of printing to during printing. A print job to be executed includes print data (image data) and data of a print setting called a job ticket. The print setting includes information of a sheet type to be used (a sheet thickness (basis weight), a sheet type, and a sheet brand), and information of the number of sheets to be printed (in the case of a cut sheet) or the number of pages to be printed (in the case of a continuous sheet). The temperature and humidity of an environment around the image forming apparatus 1 may be acquired by a temperature and humidity sensor (not illustrated) disposed in a housing of the image forming apparatus 1.

(Steps S151 and S152)

The controller 21 acquires the print setting included in the print job to be executed. In this case, the temperature and humidity sensor (not illustrated) of the image forming apparatus 1 obtains a temperature and a humidity inside the apparatus.

The controller 21 determines whether or not the execution of the thermal expansion mode is possible under any of the following print conditions 1 to 3.

(Condition 1) A case where the print job is executed using a thick cut sheet (for example, an uncoated sheet of 300 $g/m^2$) having a basis weight equal to or greater than a predetermined basis weight. In this case, there is a high possibility that an irregularity or a fixing member crease may occur on the pressurizer 261 due to an uneven portion of the leading end of the thick sheet.

(Condition 2) A case where a print job is executed using a thin continuous sheet having a predetermined basis weight or less (for example, 100 $g/m^2$ or less). In this case, the roll sheet tension is set to equal to or less than 15 N, and a sheet crease tends to occur easily, and there is a high possibility that a fixing member crease may occur due to an uneven portion of this sheet crease passing through the fixing nip N1.

(Condition 3) A case where the temperature and humidity sensor detects a high humidity (for example, 80% RH or more), and a print job for a continuous sheet is executed using a thin sheet (for example, a basis weight of 100 $g/m^2$ or less). In this case, when the sheet is left in a high-humidity environment, the waving of the sheet is poor, and thus there is a concern that a crease may occur on the sheet, and thus a fixing member crease may occur.

The controller 21 uses at least one of the conditions 1 to 3, and when the conditions 1 to 3 are satisfied, the controller 21 determines that a condition for executing the thermal expansion mode is satisfied every predetermined number of printed sheets and/or every predetermined conveyance distance.

For example, in the case of using the condition 1, when the condition 1 is satisfied, the controller 21 determines that the condition for executing the thermal expansion mode is satisfied every time the number of printed cut sheets reaches a predetermined number (for example, 2000 sheets).

In the case of using the conditions 2 and 3, when the condition 2 or the condition 3 is satisfied, the controller 21 determines that the condition for executing the thermal expansion mode is satisfied each time a distance by which the continuous sheet is conveyed reaches a predetermined distance (for example, 100 m).

The controller 21 determines, according to any of the determinations described above, whether or not the condition for executing the thermal expansion mode is satisfied according to the printing conditions. In a case where the condition for executing the thermal expansion mode is satisfied (YES), the controller 21 advances the process to step S153. On the other hand, in a case where the condition is not satisfied (NO), the controller 21 ends the subroutine process illustrated in FIG. 5 and the main process illustrated in FIG. 4A.

(Step S153)

The controller 21 ends the subroutine flowchart illustrated in FIG. 5 (return), and starts executing the thermal expansion mode shown in steps S12 to S16 of the main flowchart in FIG. 4A.

As described above, in the first modification, whether or not the execution of the thermal expansion mode is possible is determined according to the printing conditions. Therefore, it is possible to eliminate a fixing member crease and suppress an image defect at a more appropriate timing.

Second Modification (Instruction from User)

Figure 6:
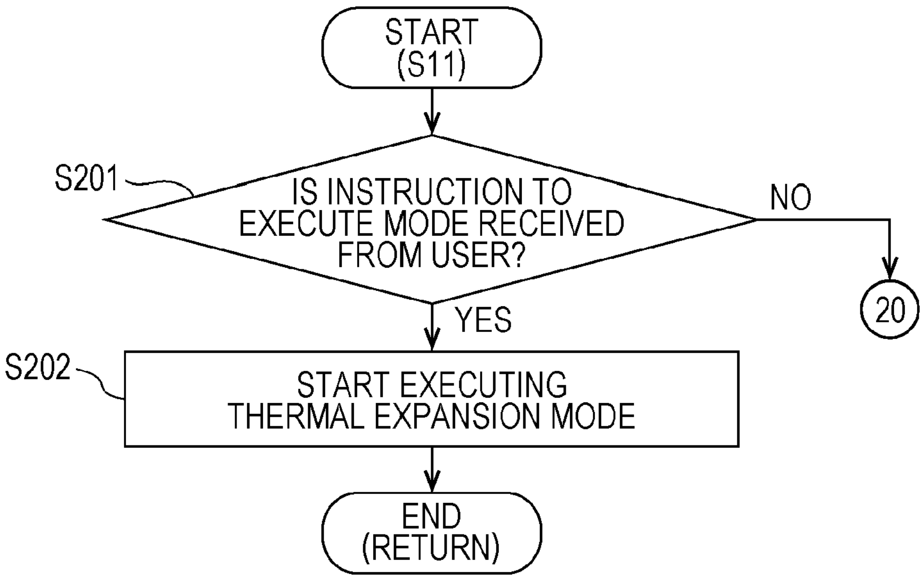
FIG. 6 is a subroutine flowchart illustrating processing in step S11 (determination as to whether execution is possible) in a second modification.

FIG. 6 is a subroutine flowchart illustrating processing in step S11 in a second modification. A subroutine process according to the second modification is executed not only during printing but also during a period other than printing.

(Step S201)

Figure 7:
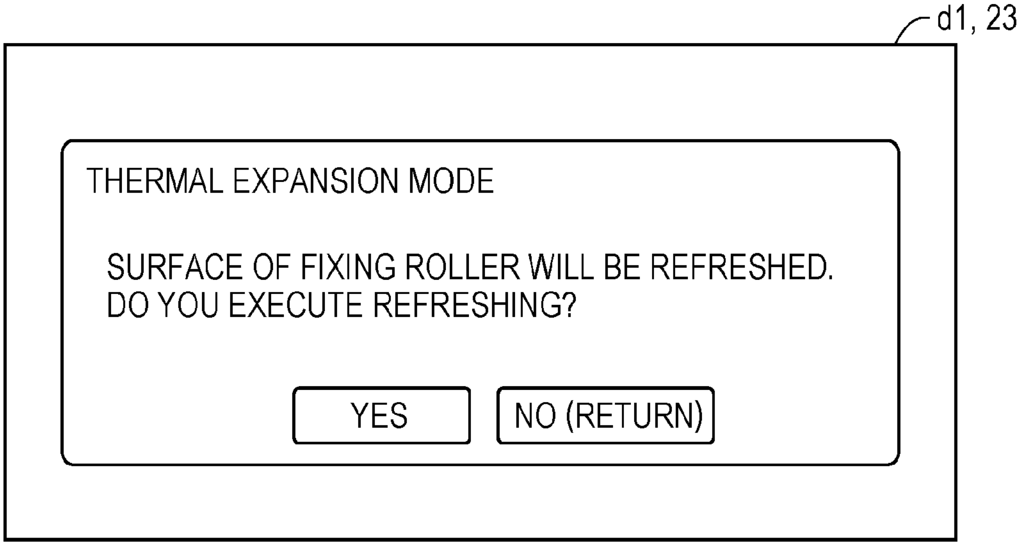
FIG. 7 is an example of a selection screen for receiving an instruction to execute the thermal expansion mode.

In step S201, the controller 21 displays a reception button for the thermal expansion mode on the operation display section 23 or a display of a PC according to an operation from the user. FIG. 7 illustrates an example of a selection screen dl displayed on the operation display section 23. The user can instruct to execute the thermal expansion mode (refresh mode) by operating a "YES" button. Instead of the operation display section 23, a dedicated hardware switch may be provided, and the switch may be operated by the user to receive an instruction to execute the thermal expansion mode. In a case where the instruction to execute the thermal expansion mode is received from the user (YES), the controller 21 advances the process to step S202. For example, a user who works in a print shop or the like and is familiar with the apparatus visually checks the printed product (continuous sheet 91). In a case where the user determines that an image defect due to a fixing member crease has occurred, the user instructs the start of execution of the thermal expansion mode. On the other hand, in a case where the execution instruction is not received from the user (NO), the controller 21 ends the subroutine process illustrated in FIG. 6 and the main process illustrated in FIG. 4A.

(Step S202)

In response to satisfaction of a predetermined condition such as reception of an instruction from a user, the controller 21 ends the subroutine flowchart illustrated in FIG. 6 (return). Then, the controller 21 starts executing the thermal expansion mode in steps S12 to S16 of the main flowchart illustrated in FIG. 4A.

As described above, in the second modification, the same effect as that in the first embodiment can be obtained, and the thermal expansion mode can be executed only when necessary by executing the thermal expansion mode only when the instruction is received from the user.

Third Modification (First Detector)

Figure 8:
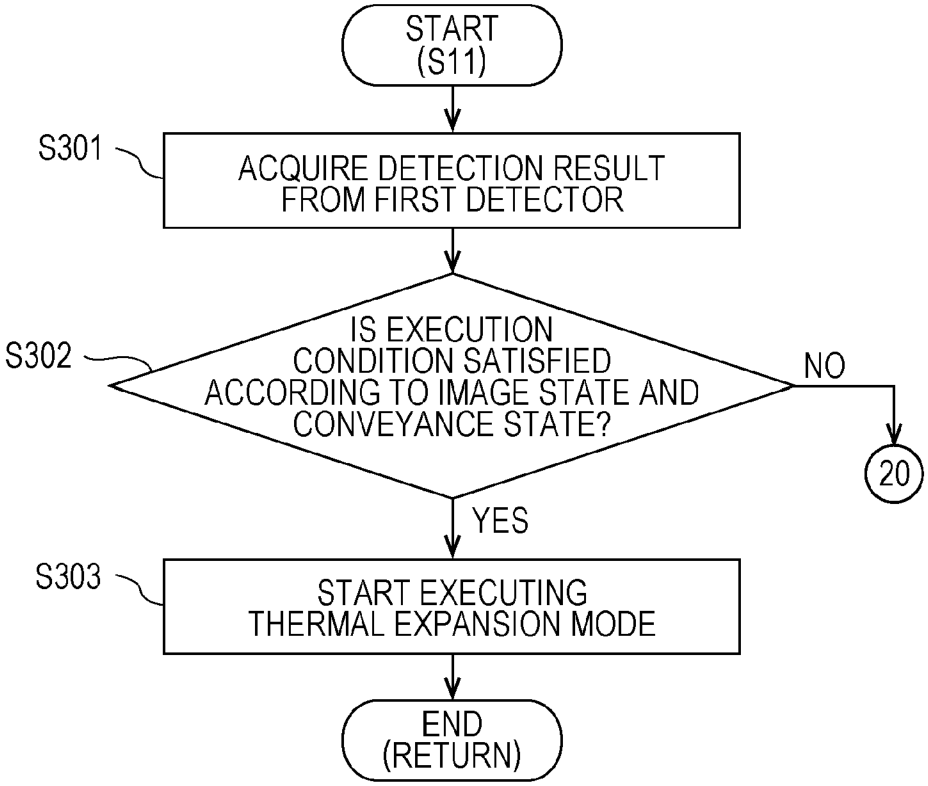
FIG. 8 is a subroutine flowchart illustrating processing in step S11 in a third modification.

FIG. 8 is a subroutine flowchart illustrating processing in step S11 in a third modification. A subroutine process according to the third modification is executed during printing. The processing in step S11 is executed at a predetermined cycle, for example, every time the formation of each page image is performed.

(Step S301)

The controller 21 acquires a detection result from the first detector (inspector 30). Specifically, as described above, a result of detecting an image state or a conveyance state is generated by analyzing a read image obtained by the first detector optically reading the continuous sheet 91. Then, the inspector 30 transmits the detection result to the image forming apparatus main body 20.

(Step S302)

The controller 21 determines whether or not the condition for executing the thermal expansion mode is satisfied according to the image state or the conveyance state indicated in the detection result. In a case where the condition for executing the thermal expansion mode is satisfied (YES), the controller 21 advances the process to step S303. For example, the controller 21 determines that the condition for executing the thermal expansion mode is satisfied in any of the following cases.

- A case where it is determined that image unevenness caused by the fixing member occurs as the image state or a case where it is determined that there is a high possibility that the image unevenness occurs.
- A case where it is determined that a sheet crease occurs as the conveyance state. On the other hand, in a case where the condition for executing the thermal expansion mode is not satisfied (NO), the controller 21 ends the subroutine process illustrated in FIG. 8 and the main process illustrated in FIG. 4A.

(Step S303)

The controller 21 ends the subroutine flowchart illustrated in FIG. 8 (return), and starts executing the thermal expansion mode shown in steps S12 to S16 of the main flowchart in FIG. 4A.

As described above, in the third modification, the same effect as that in the first embodiment can be obtained, and the thermal expansion mode is executed at a more appropriate timing according to the image state or the conveyance state, so that the occurrence of an image defect can be suppressed.

Fourth Modification (Second Detector)

Figure 9:
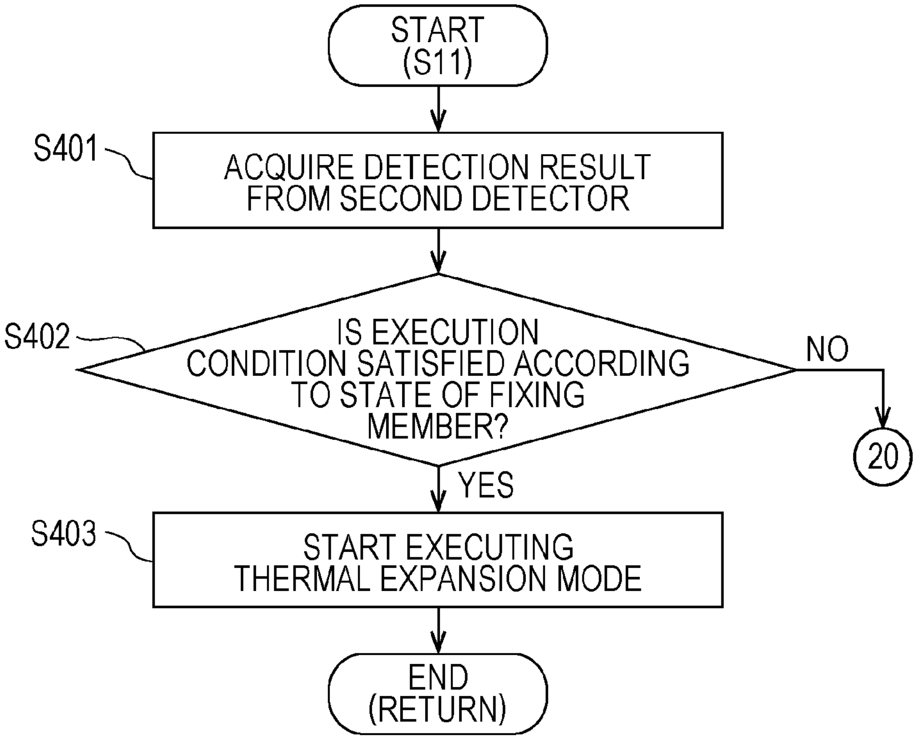
FIG. 9 is a subroutine flowchart illustrating processing in step S11 in a fourth modification.

FIG. 9 is a subroutine flowchart illustrating processing in step S11 in a fourth modification. A subroutine process according to the fourth modification is executed not only during printing but also during a period other than printing. Incidentally, a fixing member crease is likely to occur when the pressurizer 261 is at a low temperature. For example, after the start of heating of the fixer 26 from a so-called cold start, in which the image forming apparatus 1 has not been used for a long time and the fixer 26 starts to be used from a state where the entire fixer 26 is at a temperature close to room temperature, the pressurizer 261 is not sufficiently warmed for a predetermined time, for example, less than 30 minutes. In such a case, a fixing member crease tends to occur. Therefore, it is preferable to perform the process in the fourth modification within a predetermined time from the cold start.

(Step S401)

The controller 21 acquires a detection result from the second detector. Specifically, as described above, the surface state detector 27 functioning as the second detector detects the state of the surface of the pressurizer 261, and the controller 21 acquires a result of the detection.

(Step S402)

The controller 21 determines whether or not the condition for executing the thermal expansion mode is satisfied according to the state of the surface as the detection result. In a case where the condition for executing the thermal expansion mode is satisfied (YES), the controller 21 advances the process to step S403. For example, in a case where the controller 21 determines from the detection result that a fixing member crease has occurred, the controller 21 determines that the condition for executing the thermal expansion mode is satisfied. On the other hand, in a case where the condition for executing the thermal expansion mode is not satisfied (NO), the controller 21 ends the subroutine process illustrated in FIG. 9 and the main process illustrated in FIG. 4A.

(Step S403)

The controller 21 ends the subroutine flowchart illustrated in FIG. 9 (return), and starts executing the thermal expansion mode shown in steps S12 to S16 of the main flowchart in FIG. 4A. Note that in the fourth modification, elimination (correction) of a fixing member crease may be adopted as an ending condition. To be specific, in the fourth modification, detection is performed by the second detector even during the execution of the thermal expansion mode, and in a case where no fixing member crease is present, it is determined that the condition for ending step S14 in FIG. 4A is satisfied.

In this way, in the fourth modification, whether or not the execution of the thermal expansion mode is possible is determined according to the state of the fixing member, and therefore it is possible to eliminate a fixing member crease and suppress an image defect at a more appropriate timing.

Fifth Modification (Conveyance Failure)

Figure 10:
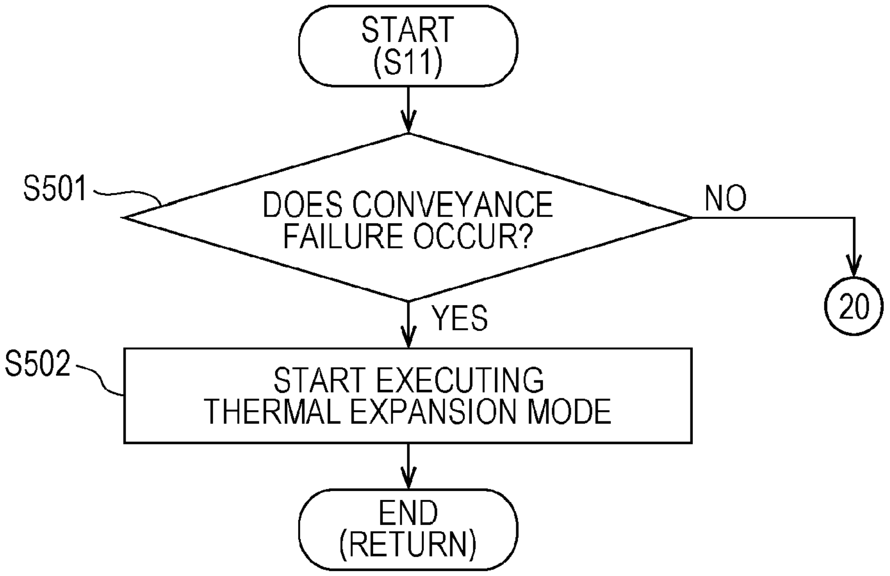
FIG. 10 is a subroutine flowchart illustrating processing in step S11 in a fifth modification.

FIG. 10 is a subroutine flowchart illustrating processing in step S11 in a fifth modification. A subroutine process according to the fifth modification is executed during printing.

(Step S501)

When a predetermined type of conveyance failure is detected in the image forming apparatus main body 20 by the sensor s1, s2, or the like during printing (YES), the controller 21 determines that the thermal expansion mode needs to be executed, and advances the process to step S502.

The predetermined type of conveyance failure is a jam during conveyance in the fixer 26, double feeding in a case of using a cut sheet, passing of a different sheet, or conveyance of continuous sheet in a twisted state. In this case, the double feeding means that a plurality of cut sheets are fed from a sheet feeding tray in a state of being overlapped. The passing of a different sheet is a case where a sheet type in a print setting is different from the type of an actually used sheet. The type of the actually used sheet is a sheet type determined from detection data of a medium detection sensor disposed above the sheet conveyance path. It may be determined that the thermal expansion mode needs to be executed in a case where the same type of conveyance failure occurs a predetermined number of times or more (for example, twice or more) as a frequency within a predetermined period (within a predetermined conveyance distance or within a predetermined number of print sheets).

(Step S502)

The controller 21 ends the subroutine flowchart illustrated in FIG. 10 (return), and starts executing the thermal expansion mode shown in steps S12 to S16 of the main flowchart in FIG. 4A.

As described above, in the fifth modification, whether or not the execution of the thermal expansion mode is possible is determined according to a conveyance failure, so that it is possible to eliminate a fixing member crease and suppress an image defect at a more appropriate timing.

Second Embodiment

In the first embodiment, the thermal expansion mode can be executed regardless of whether or not printing is being performed. In a second embodiment described below, a thermal expansion mode is executed in a state in which a fixing nip N1 is released by separating fixing members from each other in a state in which printing is not performed.

Figure 11B:
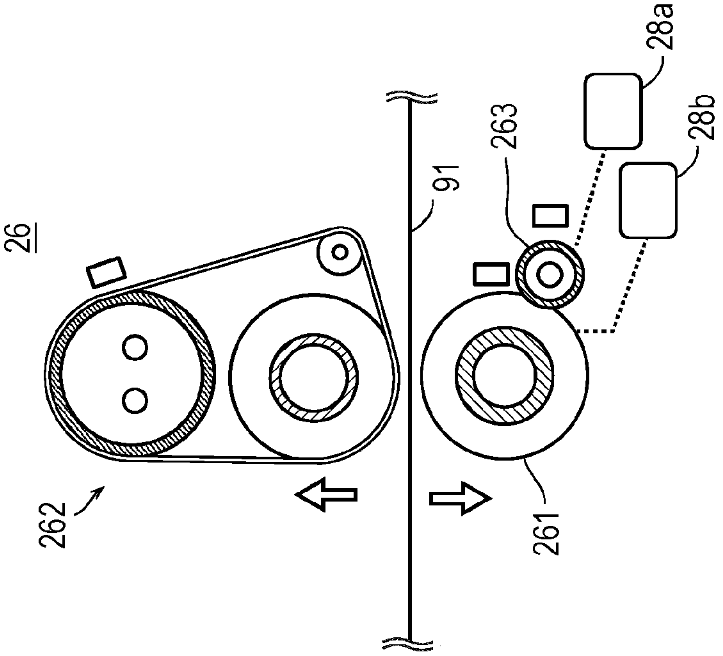
FIGS. 11A and 11B are diagrams illustrating a configuration around a fixer according to a second embodiment.
Figure 11A:
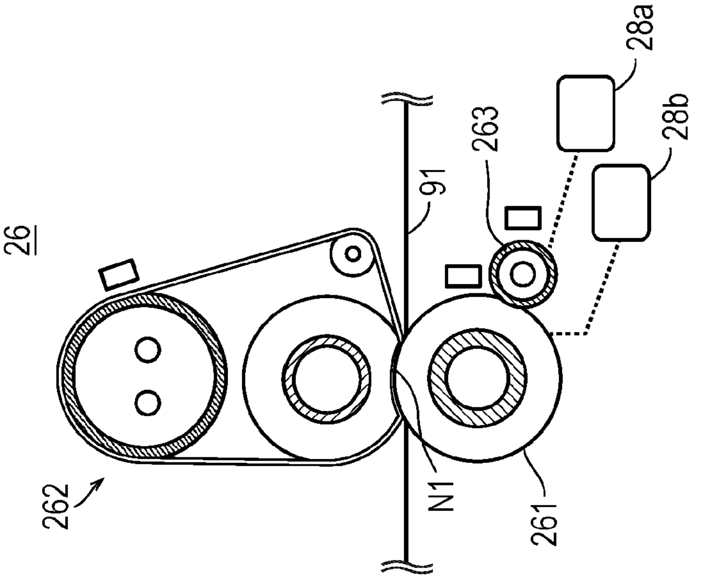
Figure 12:
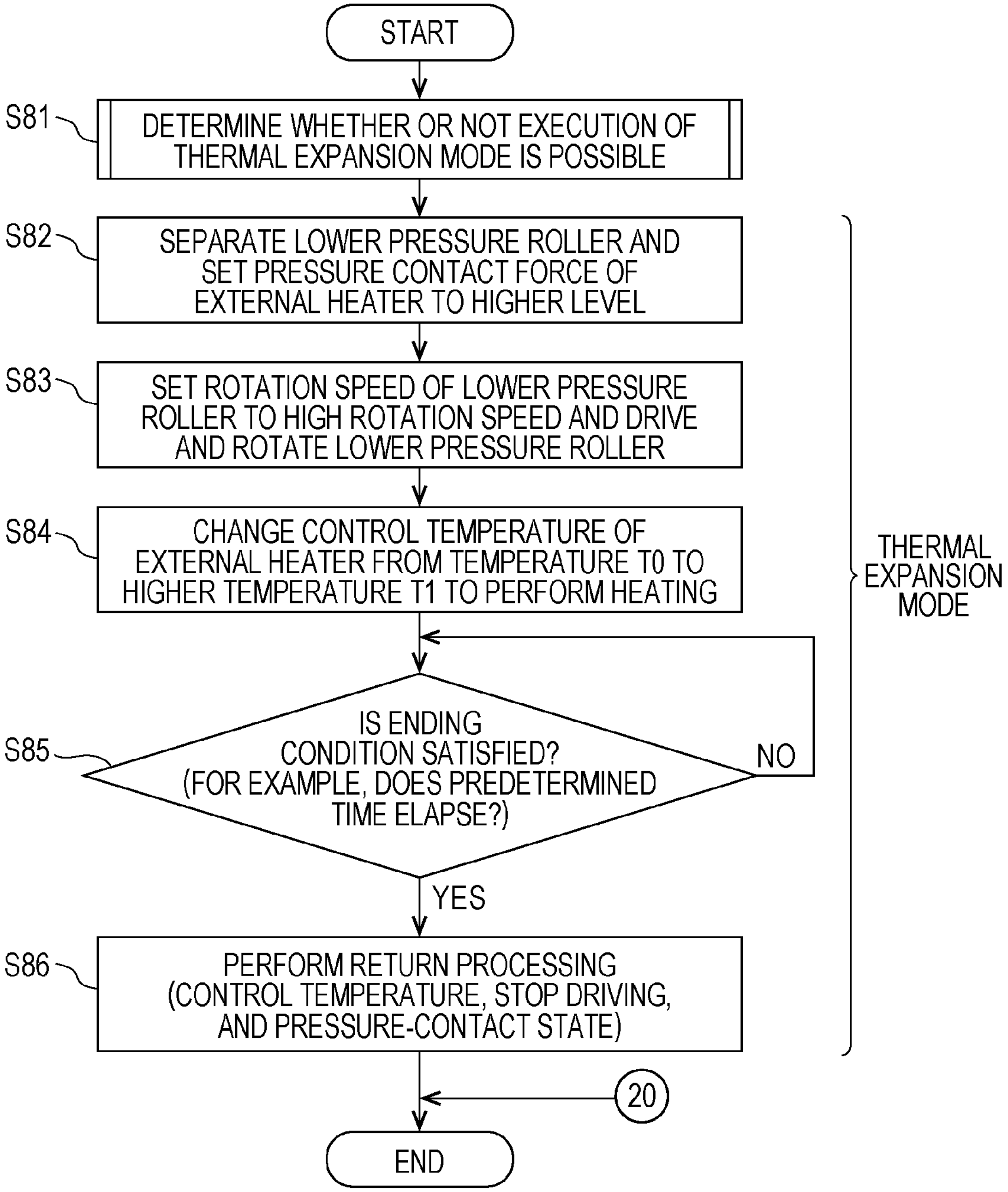
FIG. 12 is a flowchart illustrating a thermal expansion mode executed by an image forming apparatus according to the second embodiment.

FIGS. 11A and 11B are schematic diagrams illustrating a configuration around a fixer according to the second embodiment, and FIG. 12 is a flowchart illustrating the thermal expansion mode executed by an image forming apparatus according to the second embodiment. Components other than those illustrated in FIGS. 11 and 12 are the same as or similar to those in the first embodiment, and a description thereof will be omitted. FIGS. 11A and 11B are diagrams corresponding to FIG. 3, but some reference signs and a surface state detector 27 are omitted in FIGS. 11A and 11B.

In the second embodiment, the image forming apparatus 1 (an image forming apparatus main body 20) includes a moving mechanism 28*a* and a pressure contact releasing mechanism 28*b*.

Figure 13:
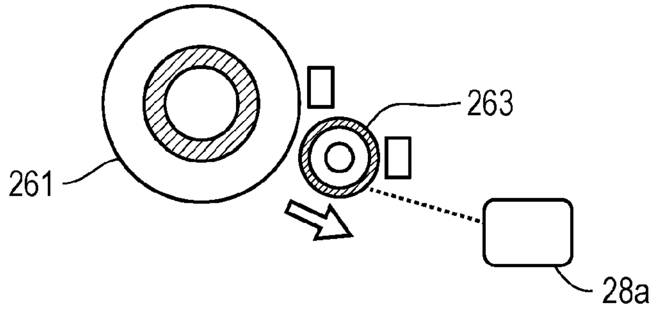
FIG. 13 is a schematic diagram illustrating a state in which an external heater is separated.

The moving mechanism 28*a* includes a biasing portion such as a spring, a drive source such as a drive motor, a cam, an arm, and the like. The moving mechanism 28*a* holds both ends of a rotation shaft of an external heater 263 and changes a pressure contact force applied to a pressurizer 261. For example, the pressure contact force is set to pressure p0 in normal printing and set to pressure p1 in the thermal expansion mode. In this case, the pressure p0<the pressure p1. For example, the pressure p0 is 20 N and the pressure p1 is 100 N. Note that the pressure p0 and p1 is sufficiently lower than pressure px at the fixing nip N1. Furthermore, the moving mechanism 28*a* may also be able to further move the external heater 263 away from the pressurizer 261 so as to set the external heater 263 and the pressurizer 261 to a non-contact separated state (FIG. 13 described later).

Similarly, the pressure contact releasing mechanism 28*b* includes a biasing portion such as a spring, a drive source such as a drive motor, a cam, an arm, and the like. The pressure contact releasing mechanism 28*b* presses the pressurizer 261 against a heater 262 and sets a pressure contact force at the time of the pressing to the predetermined pressure px. For example, the pressure px is 1000 N. Further, the pressure contact releasing mechanism 28*b* switches the state of the fixing nip N1 between a pressure-contact state and a separated state by moving at least one of the pressurizer 261 and the heater 262 (at least one of the first and second fixing members) in a direction away from the other. FIG. 11A illustrates the pressure-contact state, and FIG. 11B illustrates the separated state. FIG. 11B illustrates an example in which both the pressurizer 261 and the heater 262 are moved up and down (in directions indicated by arrows) to be separated from each other.

Thermal Expansion Mode in Second Embodiment (Step S81)

A controller 21 of the image forming apparatus main body 20 (image forming apparatus 1) determines whether or not the execution of the thermal expansion mode is possible. The processing in step S81 illustrated in FIG. 12 is the same as or similar to the processing in step S11 illustrated in FIG. 4A, and is executed in any of the subroutine flowcharts of FIG. 4B, FIG. 6, and FIGS. 8 to 10.

(Step S82)

The controller 21 causes the pressure contact releasing mechanism 28*b* to separate the pressurizer 261 (lower pressure roller) from the heater 262. In a case where printing is being performed so far, the controller 21 interrupts the printing being performed and stops driving of a sheet conveyer 24, an image former 25, a fixer 26, and the like before the separation processing in step S82. Furthermore, the moving mechanism 28*a* changes the pressure contact force of the external heater 263 against the pressurizer 261 to a higher level. For example, the pressure p0 during a normal operation is changed to the higher pressure p1 than the pressure p0.

(Step S83)

The controller 21 sets a rotation speed of a motor that drives the pressurizer 261 to be higher than a normal speed, and causes the motor to drive and rotate the pressurizer 261. For example, in a case where the normal speed at the time of normal printing is 300 mm/sec (sheet conveyance speed conversion), a high speed of 600 mm/sec is set in the thermal expansion mode.

(Step S84 and S85)

Processing in steps S84 and S85 is the same as that in S13 and S14 in FIG. 4A. The controller 21 sets a control temperature of the external heater 263 to a control temperature T1, and rotates the external heater 263 while causing the external heater 263 to be in contact with the pressurizer 261 until an ending condition is satisfied, thereby causing the pressurizer 261 (particularly, an elastic layer 62) to a state in which thermal expansion progresses more than that during normal printing, and eliminating a fixing member crease.

(Step S86)

In step S86, the controller 21 performs return processing. The controller 21 changes the control temperature of the external heater 263 back to a control temperature T0, and changes the pressure contact force applied to the pressurizer 261 back to the pressure p0. In addition, the controller 21 stops the driving of the pressurizer 261 (and the external heater 263), and the controller 21 causes the pressure contact releasing mechanism 28*b* to return the pressurizer 261 and the external heater 263 to the pressure-contact state (FIG. 11A). In a case where the printing was being executed, the interrupted printing is resumed.

As described above, in the second embodiment, in the thermal expansion mode, the temperature of the first fixing member is set to a temperature higher than that during normal printing by the external heater. Further, in the thermal expansion mode, it is performed after setting the fixer to the separated state. Thus, similarly to the first embodiment, by promoting thermal expansion, a fixing member crease that occurred on the first fixing member can be eliminated and an image defect can be suppressed. In particular, in the second embodiment, in the separated state, the heating can be performed while the pressurizer 261 and the external heater 263 are rotated at a high speed, and therefore, the supply of heat to the pressurizer 261 can be efficiently performed. In addition, by performing the heating in the separated state, it is possible to suppress heat supplied to the pressurizer 261 by the external heater 263 from being transferred via the fixing nip N1, and it is possible to efficiently heat the pressurizer 261.

Further, in the second embodiment, in the thermal expansion mode, the pressure contact force of the external heater 263 to the pressurizer 261 is set to the high pressure p1. Thus, deformation of the elastic layer 62 of the pressurizer 261 can be eliminated earlier and the elastic layer 62 can be made uniform.

Other Configuration Examples

Other examples and other configuration examples will be described with reference to FIGS. 13 to 16. These examples can be applied to the above-described first and second embodiments and each of the modifications.

FIG. 13 is a schematic view illustrating a state in which the external heater 263 is separated. Switching to the separated state is performed by the moving mechanism 28*a*. The external heater 263 may be brought into contact with the pressurizer 261 only when the thermal expansion mode is executed, and otherwise may be set to the separated state as illustrated in FIG. 13.

Figure 14:
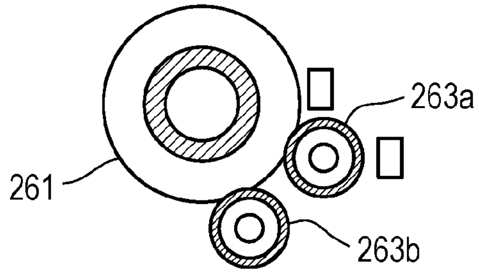
FIG. 14 is a schematic diagram illustrating another example of a configuration of the external heater.
Figure 15:
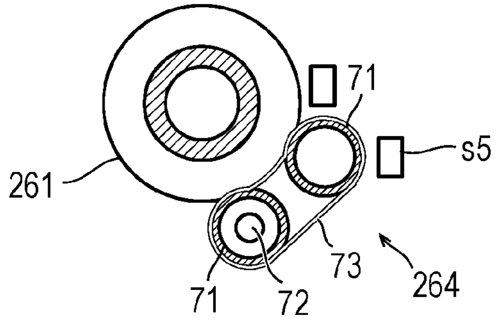
FIG. 15 is a schematic diagram illustrating another example of the configuration of the external heater.
Figure 16:
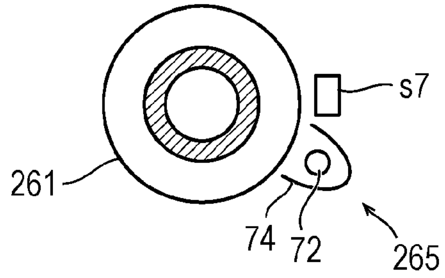
FIG. 16 is a schematic diagram illustrating another example of the configuration of the external heater.

FIGS. 14 to 16 are schematic diagrams illustrating other configuration examples of the external heater. In FIG. 14, two external heaters 263*a* and 263*b* are disposed. Each of the external heaters 263*a* and 263*b* has the same configuration as that of the external heater 263 described in the first embodiment and the like. With the configuration in which the plurality of external heaters 263*a* and 263*b* are disposed as illustrated in FIG. 14, heat can be rapidly supplied to the pressurizer 261, so that the thermal expansion mode can be effected within a short time. In particular, this configuration is suitable for a case where the thermal expansion mode is executed with the pressurizer 261 and the heater 262 in the separated state as in the second embodiment.

An external heater 264 illustrated in FIG. 15 includes two metal rollers 71, a heater 72, and a belt 73 wound around the metal rollers. The belt 73 is made of a material similar to that of the fixing belt 52, and is in contact with the pressurizer 261. Since the external heater 264 includes the belt 73 as illustrated in FIG. 15, a contact time (contact distance) of the belt 73 with the pressurizer 261 is long. Accordingly, heat can be rapidly supplied to the pressurizer 261, and thus the thermal expansion mode can be effected within a short time. In particular, this configuration is suitable for a case where the thermal expansion mode is executed with the pressurizer 261 and the heater 262 in the separated state as in the second embodiment.

As illustrated in FIG. 16, an external heater 265 includes a heater 72 that is a halogen lamp, and a reflection member 74. With the external heater 265, the same effects as those obtained by the other external heater 263 and the like can be obtained.

The configuration of each image forming apparatus described above is a main configuration described for explaining the features of the above-described embodiments, and is not limited to the above-described configuration and can be variously modified within the scope of the claims. In addition, a configuration included in a general image forming apparatus is not excluded.

For example, the example in which the image forming apparatus 1 according to the first embodiment illustrated in FIG. 1 and the like includes the first detector (the inspector 30) and the second detector (the surface state detector 27) has been described, but a configuration in which these detectors are omitted may be employed. In addition, each of the modifications and each of the configuration examples may be applied to each of the embodiments of the first and second embodiments or may be applied in combination. For example, when the thermal expansion mode is executed, the moving mechanism 28*a* sets the pressure contact force of the external heater 263 against the pressurizer 261 to the pressure p1 higher than normal pressure (FIG. 12). Further, the configuration in which the separation is performed by the moving mechanism 28*a* (FIG. 13) in a case where the thermal expansion mode is not executed can be applied to the first embodiment and each modification.

In addition, as the configuration of the fixer 26, in the example illustrated in FIG. 3, the pressurizer 261 as the first fixing member on the lower side is disposed on the lower side, and the heater 262 on the upper side (toner image surface side before fixing) functions as the second fixing member. However, the present invention is not limited to this configuration. Further, a configuration in which the first fixing member having the elastic layer is disposed on the upper side (toner image surface side before fixing) and the second fixing member is disposed on the lower side (non-toner image surface side) may also be employed. That is, an external heater may be provided for the upper pressure roller 53 having the elastic layer, and this upper pressure roller 53 may function as the first fixing member and the pressurizer 261 (lower pressure roller) may function as the second fixing member. Further, the second fixing member may be of a fixing roller type in which a fixing nip N1 is formed by a pair of fixing rollers, instead of a fixing belt type using a fixing belt. Furthermore, the example in which the temperature detected by the temperature sensor s6 for measuring the temperature of the surface of the external heater 263 is controlled to be the control temperature T1 in the thermal expansion mode has been described. However, the controller 21 may use the sensor s7 to perform control so that the temperature detected by the sensor s7 for measuring the temperature of the surface of the pressurizer 261 becomes a control temperature higher than an average temperature in normal printing.

Furthermore, the sections and methods for performing various kinds of processing in the image forming apparatuses according to the above-described embodiments can be implemented by either a dedicated hardware circuit or a programmed computer. For example, the programs described above may be provided by a computer-readable recording medium such as a USB memory or a digital versatile disc (DVD)-ROM, or may be provided online via a network such as the Internet. In this case, the programs recorded in the computer-readable recording medium are normally transferred to and stored in a storage section such as a hard disk. In addition, the programs may be provided as independent application software or may be incorporated into software of an apparatus as one function of the apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus comprising:

an image former that forms an image on a recording material;

a fixer comprising a first fixing member having an elastic layer, a second fixing member that forms a fixing nip with the first fixing member, and an external heater that heats the first fixing member from outside, the second fixing member having a second heater for heating the second fixing member to a temperature during normal printing such that the fixer fixes the image on the recording material by heating and pressing the conveyed recording material at the fixing nip; and a hardware processor that executes a thermal expansion mode, wherein in the thermal expansion mode, the hardware processor causes the external heater to heat the first fixing member to a temperature higher than the temperature during normal printing, and wherein the thermal expansion mode is executable during printing.

2. The image forming apparatus according to claim 1, wherein the hardware processor determines, based on a predetermined condition set in advance, whether or not the execution of the thermal expansion mode is possible.

3. The image forming apparatus according to claim 2, wherein the hardware processor determines, based on a printing condition as the predetermined condition, whether or not the execution of the thermal expansion mode is possible.

4. The image forming apparatus according to claim 1, wherein the hardware processor receives an instruction from a user, and the hardware processor executes the thermal expansion mode upon receiving an execution instruction.

5. The image forming apparatus according to claim 1, further comprising a first detector that detects a state of the image on the recording material after the fixing or detects a conveyance state of the recording material on a downstream side of the fixer, wherein the hardware processor executes the thermal expansion mode according to a result of the detection by the first detector.

6. The image forming apparatus according to claim 1, further comprising a second detector that detects a state of the first fixing member, wherein the hardware processor detects a state of the first fixing member, and the hardware processor executes the thermal expansion mode according to a result of the detection by the second detector.

7. The image forming apparatus according to claim 6, wherein the hardware processor ends the thermal expansion mode being executed according to the result of the detection by the second detector.

8. The image forming apparatus according to claim 1, wherein the hardware processor determines, based on a type of a failure of conveyance of the recording medium or a frequency of a failure of conveyance of the recording medium, whether or not the execution of the thermal expansion mode is possible.

9. The image forming apparatus according to claim 1, wherein the external heater is a rotating body in which a heating source is disposed and which rotates while being in pressure contact with an outer peripheral surface of the first fixing member, the image forming apparatus further comprises a pressure setting mechanism that changes a pressure contact force of the external heater to the first fixing member, and the hardware processor sets the pressure contact force to a pressure higher than a pressure during normal printing when the thermal expansion mode is executed.

10. The image forming apparatus according to claim 1, further comprising a pressure contact releasing mechanism that separates the first fixing member and the second fixing member from each other by moving at least one of the first fixing member and the second fixing member, wherein the hardware processor causes the pressure contact releasing mechanism to separate the first fixing member and the second fixing member from each other when the thermal expansion mode is executed.

11. The image forming apparatus according to claim 1, wherein in the thermal expansion mode, the hardware processor sets a rotation speed of the first fixing member to a rotation speed higher than a rotation speed during normal printing.

12. The image forming apparatus according to claim 1, wherein the recording material is a continuous sheet.

13. The image forming apparatus according to claim 1, wherein the thermal expansion mode is executed during printing.

* * * * *